United States Patent [19]

Coffindaffer

[11] Patent Number: 4,976,878

[45] Date of Patent: Dec. 11, 1990

[54] PROCESS FOR RECOVERING GELLED AQUEOUS LIQUID FABRIC SOFTENER

[75] Inventor: Timothy W. Coffindaffer, Loveland, Ohio

[73] Assignee: The Procter & Gamble Company, Cincinnati, Ohio

[21] Appl. No.: 466,901

[22] Filed: Jan. 18, 1990

[51] Int. Cl.$^5$ .................... D06M 11/00; D06M 13/00; B01D 17/04

[52] U.S. Cl. .................................... 252/8.6; 252/8.75; 252/8.8; 252/8.7; 252/347

[58] Field of Search ......................... 252/8.6, 8.7, 8.75, 252/8.8, 8.9, 347

[56] References Cited

U.S. PATENT DOCUMENTS

| | | | |
|---|---|---|---|
| 3,644,203 | 2/1972 | Lamberti et al. | 252/8.7 |
| 3,775,316 | 11/1973 | Berg et al. | 252/8.8 |
| 3,904,533 | 9/1975 | Neiditch | 252/8.75 |
| 4,327,133 | 4/1982 | Rudy et al. | 427/242 |
| 4,460,485 | 7/1984 | Rapisarda et al. | 252/8.75 |
| 4,464,272 | 8/1984 | Parslow et al. | 252/8.8 |
| 4,661,269 | 4/1987 | Trinh et al. | 252/8.75 |

OTHER PUBLICATIONS

Laughlin, R. et al., Physical Science of the Dioctadecyldimethlammonium Chloride-Water System . . . , Journal of Physical Chemistry (94) 2546–2552, 1990.

*Primary Examiner*—Paul Lieberman
*Assistant Examiner*—J. Darland
*Attorney, Agent, or Firm*—Robert B. Aylor; Richard C. Witte

[57] ABSTRACT

Aqueous liquid fabric softening compositions that have been exposed to low temperatures and "gelled", can be recovered and the original dispersion reformed by heating the compositions to above the Krafft temperature of the composition and then applying shear. Only very light shearing action is required to make the compositions free-flowing again. Electrolyte can be added to aid in recovery. The process can use many different kinds of heating and the process can be applied to both packaged and bulk products.

22 Claims, No Drawings

PROCESS FOR RECOVERING GELLED AQUEOUS LIQUID FABRIC SOFTENER

TECHNICAL FIELD

This invention relates to processes for reforming stable dispersions in liquid fabric softener compositions of the type that is conventionally used for softening fabrics during the rinse cycle of home laundering operations.

Liquid fabric softening compositions have long been known in the art and are widely utilized by consumers during the rinse cycles of automatic laundry operations. The term "fabric softening" as used herein and as known in the art refers to a process whereby a desirably soft hand and fluffy appearance are imparted to fabrics. Such compositions are commonly sold in the form of aqueous dispersions to facilitate their use in the laundry process. However, since they are aqueous, they can be damaged by prolonged exposure to low temperatures, e.g., at, or below about 0° C., which destroys the dispersion of the fabric softener active, typically a relatively water insoluble quaternary ammonium compound, and forms a "gel" structure that is not destroyed upon reheating to room temperature.

Previous attempts to solve the "gelling" problem have utilized relatively expensive materials added to the formula for the purposes of either avoiding freezing or breaking up the "gel" that typically forms when the compositions are, e.g., chilled or frozen. The alternatives in the past included scrapping the product or using the unstable, non-homogeneous product which could result in undesirable results. For example, the gelled product does not disperse readily, increasing the risk of staining and or failure to soften properly.

BACKGROUND ART

Compositions containing cationic nitrogenous compounds in the form of quaternary ammonium salts and/or substituted imidazolinium salts having two long chain acyclic aliphatic hydrocarbon groups are commonly used to provide fabric softening benefits when used laundry rinse operations (See, for example, U.S. Pat. Nos. 3,644,203, Lamberti et al., issued Feb. 22, 1972; and 4,426,299, Verbruggen, issued Jan. 17, 1984, said patents being incorporated herein by reference; also "Cationic Surface Active Agents as Fabric Softeners," R. R. Egan, Journal of the American Oil Chemists' Society, January 1978, pages 118–121; and "How to Choose Cationics for Fabric Softeners," J. A. Ackerman, Journal of the American Oil Chemists' Society, June 1983, pages 1166–1169).

Quaternary ammonium salts having only one long chain acyclic aliphatic hydrocarbon group (such as monostearyltrimethyl ammonium chloride) are less commonly used because for the same chain length, compounds with two long alkyl chains were found to provide better softening performance than those having one long alkyl chain. (See, for example, "Cationic Fabric Softeners," W. P. Evans, Industry and Chemistry, July 1969, pages 893–903). U.S. Pat. No. 4,464,272, Parslow et al., issued Aug. 7, 1984, incorporated herein by reference, also teaches that monoalkyl quaternary ammonium compounds are less effective softeners.

Another class of nitrogenous materials that are sometimes used in fabric softening compositions is the nonquaternary amide-amines. A commonly cited material is the reaction product of higher fatty acids with hydroxyalkylalkylenediamines. An example of these materials is the reaction product of higher fatty acids and hydroxyethylethylenediamine (See "Condensation Products from β-Hydroxyethylethylenediamine and Fatty Acids or Their Alkyl Esters and Their Application as Textile Softeners in Washing Agents," H. W. Eckert, Fette-Seifen-Anstrichmittel, September 1972, pages 527–533). These materials are usually cited generically along with other cationic quaternary ammonium salts and imidazolinium salts as softening actives in fabric softening compositions. (See U.S. Pat. Nos. 4,460,485, Rapisarda et al., issued July 17, 1984; 4,421,792, Rudy et al., issued Dec. 20, 1983; 4,327,133, Rudy et al., issued April 27, 1982, all of said patents being incorporated herein by reference). U.S. Pat. No. 3,775,316, Berg et al., issued Nov. 27, 1973, incorporated herein by reference, discloses a softening finishing composition for alkyl alkylpolyamine and fatty acids and (b) a quaternary ammonium compound mixture of (i) from 0% to 100% of quaternary ammonium salts having two long chain alkyl groups and (ii) from 100% to 0% of a germicidal quaternary ammonium compound of the formula $[R_5R_6R_7R_8N]+A-$ wherein $R_5$ is a long chain alkyl group, $R_6$ is a member selected from the group consisting of arylalkyl group and $C_3$–$C_{18}$ alkenyl and alkadienyl containing one or two C═C double bonds, $R_7$ and $R_8$ are $C_1$–$C_7$ alkyl groups, and A is an anion. U.S. Pat. No. 3,904,533, Neiditch et al., issued Sept. 9, 1975, incorporated herein by reference, teaches a fabric conditioning formulation containing a fabric softening compound and a low temperature stabilizing agent which is a quaternary ammonium salt containing one to three short chain $C_{10}$–$C_{14}$ alkyl groups; the fabric softening compound is selected from a group consisting of quaternary ammonium salts containing two or more long chain alkyl groups, the reaction product of fatty acids and hydroxyalkylalkylenediamine, and other cationic materials.

SUMMARY OF THE INVENTION

The present invention relates to the recovery of gelled aqueous liquid fabric softening compositions intended for use in home laundry operations. The present invention is based on the discovery that a relatively simple process can be used to reform stable dispersions of fabric softener actives from gelled aqueous liquid fabric softener compositions. Thus the invention relates to: A process for treating a gelled aqueous liquid fabric softener composition, that was originally in the form of a stable dispersion of a relatively water insoluble softening active in aqueous medium, to recover said composition by reforming a stable dispersion, comprising the steps of heating said composition to a temperature at least about the Krafft temperature ("point") of the composition and applying shear to the composition.

DETAILED DESCRIPTION OF THE INVENTION

The process to recover the product from the gel state to a stable aqueous dispersion can be carried out in the home, when a composition that is packaged in consumer usable form is involved, by simply immersing the package in hot tap water to raise the temperature, typically to about 35.C, or preferably above about 40° C., and then shaking the package vigorously. It is surprising that a stable dispersion can be reformed with relatively low shear, since the initial preparation of a stable dispersion requires very high shear mixing.

The process can also be accomplished by heating the packaged composition in a conventional microwave oven to raise the temperature at least about, and preferably above, the Krafft point. For the typical fabric softener composition in a typical 1500 watt microwave oven, this will involve from about four to about thirteen minutes, preferably from about seven to about eleven minutes, of heating at a low power setting, e.g., about 450 watts, per 100 ounces of the composition. It is preferable to heat the composition slowly, shaking and repositioning the bottle about every minute, to avoid any chance that excessive pressures will be generated and to avoid the creation of localized "hot spots" in the package.

For larger amounts of product, the product can either be heated in bulk, or in the individual packages, and then sheared, using either shaking, or in the case of bulk product, a stirrer. The method of heating may be critical, e.g., where there is a package involved or where the product contains heat sensitive materials, but from the standpoint of redispersing the softener actives, any method of heating and any method of applying sufficient shear will provide the benefit.

The recovery of the composition can be improved, if required, by adding electrolyte, e.g., inorganic electrolyte. For convenience, the electrolyte, either common table salt (NaCl), or one of the other electrolytes described hereinafter, can be dissolved first in water to facilitate mixing, and then added to the gelled composition. Typically, the level of electrolyte added is less than about 3,500 ppm, preferably less than about 2,500 ppm, more preferably less than about 2,000 ppm. Preferably no electrolyte is added to packaged compositions since this would modify the physical characteristics of the composition after it is redispersed. For product exposed to more extreme conditions, e.g., more than 24 hours at 0° C., or lower, higher levels of electrolyte within the above ranges are used. Lower levels are used when the conditions are less extreme.

The Aqueous Liquid Fabric Softener Composition

The amount of fabric softening agent in the compositions of this invention is typically from about 3% to about 35%, preferably from about 4% to about 27%, by weight of the composition. The lower limits are amounts needed to contribute effective fabric softening performance when added to laundry rinse baths in the manner which is customary in home laundry practice. The higher limits are suitable for concentrated products which provide the consumer with more economical usage due to a reduction of packaging and distributing costs.

Some preferred compositions are disclosed in U.S. Pat. No. 4,661,269, issued Apr. 28, 1987, in the names of Toan Trinh, Errol H. Wahl, Donald M. Swartley and Ronald L. Hemingway, said patent being incorporated herein by reference.

The Composition

The fabric softening composition comprises the following components:

I. from about 3% to about 35%, preferably from about 4% to about 27%, by weight of the total composition of a fabric softener

[One suitable fabric softener is a mixture comprising:

(a) from about 10% to about 92% of the reaction product of higher fatty acids with a polyamine selected from the group consisting of hydroxyalkylalkylenediamines and dialkylenetriamines and mixtures thereof;

(b) from about 8% to about 90% of cationic nitrogenous salts containing only one long chain acyclic aliphatic $C_{15}$–$C_{22}$ hydrocarbon group; and optionally, (c) from 0% to about 80% of cationic nitrogenous salts having two or more long chain acyclic aliphatic $C_{15}$–$C_{22}$ hydrocarbon groups or one said group and an arylalkyl group;

said (a), (b) and (c) percentages being by weight of Component I]; and

II. the balance of the composition comprising a liquid carrier selected from the group consisting of water and mixtures of the water and $C_1$–$C_4$ monohydric alcohols.

As used herein, Component I comprises either an individual softener or a mixture of fabric softening actives.

Following are the general descriptions of the essentials and optionals of the present compositions including a specific example. The example is provided herein for purposes of illustration only and is not intended to limit the claims, unless otherwise specified.

The Fabric Softeners

Fabric softeners that can be used herein are disclosed in U.S. Pat. Nos. 3,861,870, Edwards and Diehl; 4,308,151, Cambre; 3,886,075, Bernardino; 4,233,164, Davis; 4,401,578, Verbruggen; 3,974,076, Wiersema and Rieke; and 4,237,016, Rudkin, Clint, and Young, all of said patents being incorporated herein by reference.

A preferred fabric softener of the invention comprises the following:

Component I(al

A preferred softening agent (active) of the present invention is the reaction products of higher fatty acids with a polyamine selected from the group consisting of hydroxyalkylalkylenediamines and dialkylenetriamines and mixtures thereof. These reaction products are mixtures of several compounds in view of the multi. functional structure of the polyamines (see, for example, the publication by H. W. Eckert in Fette-Seifen-Anstrichmittel, cited above).

The preferred Component I(a) is a nitrogenous compound selected from the group consisting of the reaction product mixtures or some selected components of the mixtures. More specifically, the preferred Component I(a) is compounds selected from the group consisting of:

(i) the reaction product of higher fatty acids with hydroxyalkylalkylenediamines in a molecular ratio of about 2:1, said reaction product containing a composition having a compound of the formula:

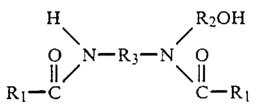

wherein $R_1$ is an acyclic aliphatic $C_{15}$–$C_{21}$ hydrocarbon group and $R_2$ and $R_3$ are divalent $C_1$–$C_3$ alkylene groups;

(ii) substituted imidazoline compounds having the formula:

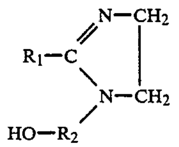

wherein $R_1$ and $R_2$ are defined in above;

(iii) substituted imidazoline compounds having the formula:

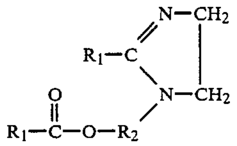

wherein $R_1$ and $R_2$ are defined as above;

(iv) the reaction product of higher fatty acids with dialkylenetriamines in a molecular ratio of about 2:1, said reaction product containing a composition having a compound of the formula:

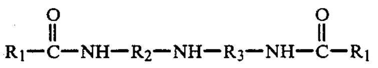

wherein $R_1$, $R_2$ and $R_3$ are defined as above; and (v) substituted imidazoline compounds having the formula:

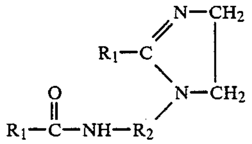

wherein $R_1$ and $R_2$ are defined as above; and mixtures thereof.

Component I(a)(i) is commercially available as Mazamide® 6, sold by Mazer Chemicals, or Ceranine® HC, sold by Sandoz Colors & Chemicals; here the higher fatty acids are hydrogenated tallow fatty acids and the hydroxyalkylalkylenediamine is N-2-hydroxyethylethylenediamine, and $R_1$ is an aliphatic $C_{15}$–$C_{17}$ hydrocarbon group, and $R_2$ and $R_3$ are divalent ethylene groups.

An example of Component I(a)(ii) is stearic hydroxyethyl imidazoline wherein RI is an aliphatic $C_{17}$ hydrocarbon group, $R_2$ is a divalent ethylene group; this chemical is sold under the trade names of Alkazine® ST by Alkaril Chemicals, Inc., or Schercozoline® S by Scher Chemicals, Inc.

An example of Component I(a)(iv) is N,N''-ditallowalkoyldiethylenetriamine where $R_1$ is an aliphatic $C_{15}$–$C_{17}$ hydrocarbon group and $R_2$ and $R_3$ are divalent ethylene groups.

An example of Component I(a)(v) is 1-tallowamidoethyl-2-tallowimidazoline wherein $R_1$ is an aliphatic $C_{15}$–$C_{17}$ hydrocarbon group and $R_2$ is a divalent ethylene group.

The Component I(a)(v) can also be first dispersed in a Bronstedt acid dispersing aid having a pKa value of not greater than 6; provided that the pH of the final composition is not greater than 7. Some preferred dispersing aids are formic acid, phosphoric acid, or methylsulfonic acid.

Both N,N''-ditallowalkoyldiethylenetriamine and 1-tallowethylamido-2-tallowimidazoline are reaction products of tallow fatty acids and diethylenetriamine, and are precursors of the cationic fabric softening agent methyl-1-tallowamidoethyl-2-tallowimidazolinium methylsulfate (see "Cationic Surface Active Agents as Fabric Softeners," R. R. Egan, Journal of the American Oil Chemicals' Society, January 1978, pages 118–121). N,N''-ditallowalkoyldiethylenetriamine and 1-tallowamidoethyl-2-tallowimidazoline can be obtained from Sherex Chemical Company as experimental chemicals. Methyl-1-tallowamidoethyl-2-tallowimidazolinium methylsulfate is sold by Sherex Chemical Company under the trade name Varisoft® 475.

Component I(b)

The preferred Component I(b) is a cationic nitrogenous salt containing one long chain acyclic aliphatic $C_{15}$–$C_{22}$ hydrocarbon group selected from the group consisting of:

(i) acyclic quaternary ammonium salts having the formula:

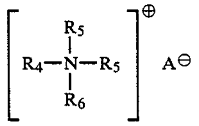

wherein $R_4$ is an acyclic aliphatic $C_{15}$–$C_{22}$ hydrocarbon group, $R_5$ and $R_6$ are $C_1$–$C_4$ saturated alkyl or hydroxyalkyl groups, and $A^{\ominus}$ is an anion;

(ii) substituted imidazolinium salts having the formula:

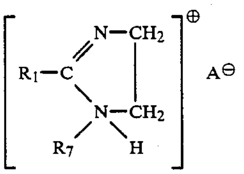

wherein $R_1$ is an acyclic aliphatic $C_{15}$–$C_{21}$ hydrocarbon group, $R_7$ is a hydrogen or a $C_1$–$C_4$ saturated alkyl or hydroxyalkyl group, and $A^{\ominus}$ is an anion;

(iii) substituted imidazolinium salts having the formula:

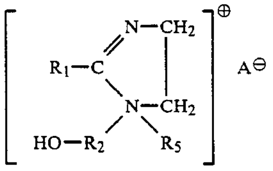

wherein $R_2$ is a divalent $C_1$–$C_3$ alkylene group and $R_1$, $R_5$ and $A^{\ominus}$ are as defined above;

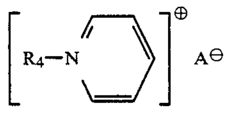

wherein $R_4$ is an acyclic aliphatic $C_{16}$–$C_{22}$ hydrocarbon group and $A^{\ominus}$ is an anion; and (v) alkanamide alkylene pyridinium salts having the formula:

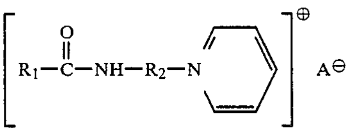

wherein $R_1$ is an acyclic aliphatic $C_{15}$–$C_{21}$ hydrocarbon group, $R_2$ is a divalent $C_1$–$C_3$ alkylene group, and $A^{\ominus}$ is an ion group; and mixtures thereof.

Examples of Component I(b)(i) are the monoalkyltrimethylammonium salts such as monotallowtrimethylammonium chloride, mono(hydrogenated tallow)-trimethylammonium chloride, palmityltrimethylammonium chloride and soyatrimethylammonium chloride, sold by Sherex Chemical Company under the trade names Adogen® 471, Adogen 441, Adogen 444, and Adogen 415, respectively. In these salts, $R_4$ is an acyclic aliphatic $C_{16}$–$C_{18}$ hydrocarbon group, and $R_5$ and $R_6$ are methyl groups. Mono(hydrogenated tallow)-trimethylammonium chloride and monotallowtrimethylammonium chloride are preferred. Other examples of Component I(b)(i) are behenyltrimethylammonium chloride wherein $R_4$ is a $C_{22}$ hydrocarbon group and sold under the trade name Kemamine® Q2803-C by Humko Chemical Division of Witco Chemical Corporation; soyadimethylethylammonium ethosulfate wherein $R_4$ is a $C_{16}$–$C_{18}$ hydrocarbon group, $R_5$ is a methyl group, $R_6$ is an ethyl group, and A is an ethylsulfate anion, sold under the trade name Jordaquat® 1033 by Jordan Chemical Company; and methyl-bis(2-hydroxyethyl)octadecylammonium chloride wherein $R_4$ is a $C_{18}$ hydrocarbon group, $R_5$ is a 2-hydroxyethyl group and $R_6$ is a methyl group and available under the trade name Ethoquad® 18/12 from Armak Company.

An example of Component I(b)(iii) is 1-ethyl-1-(2-hydroxyethyl)-2-isoheptadecylimidazolinium ethylsulfate wherein $R_1$ is a $C_{17}$ hydrocarbon group, $R_2$ is an ethylene group, $R_5$ is an ethyl group, and A is an ethylsulfate anion. It is available from Mona Industries, Inc., under the trade name Monaquat® ISIES.

A preferred composition contains Component I(a) at a level of from about 50% to about 90% by weight of Component I and Component I(b) at a level of from about 10% to about 50% by weight of Component I.

Cationic Nitrogenous Salts I(c)

Preferred cation nitrogenous salts having two or more long chain acyclic aliphatic $C_{15}$–$C_{22}$ hydrocarbon groups or one said group and an arylalkyl group which can be used either alone or as part of a mixture are selected from the group consisting of:

(i) acyclic quaternary ammonium salts having the formula:

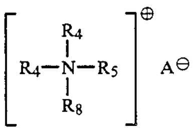

wherein $R_4$ is an acyclic aliphatic $C_{15}$–$C_{22}$ hydrocarbon group, $R_5$ is a $C_1$–$C_4$ saturated alkyl or hydroxyalkyl group, $R_8$ is selected from the group consisting of $R_4$ and $R_5$ groups, and $A^{\ominus}$ is an anion defined as above;

(ii) diamido quaternary ammonium salts having the formula:

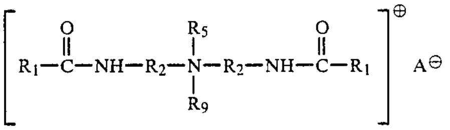

wherein $R_1$ is an acyclic aliphatic $C_{15}$–$C_{21}$ hydrocarbon group, $R_2$ is a divalent alkylene group having 1 to 3 carbon atoms, $R_5$ and $R_9$ are $C_1$–$C_4$ saturated alkyl or hydroxyalkyl groups, and $A^{\ominus}$ is an anion;

(iii) diamino alkoxylated quaternary ammonium salts having the formula:

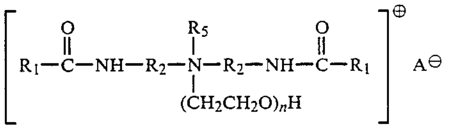

wherein n is equal to 1 to about 5, and $R_1$, $R_2$, $R_5$ and $A^{\ominus}$ are as defined above;

(iv) quaternary ammonium compounds having the formula:

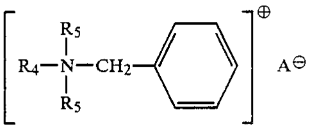

wherein $R_4$ is an acyclic aliphatic $C_{15}$–$C_{22}$ hydrocarbon group, $R_5$ is a $C_1$–$C_4$ saturated alkyl or hydroxyalkyl group, $A^{\ominus}$ is an anion;

(v) substituted imidazolinium salts having the formula:

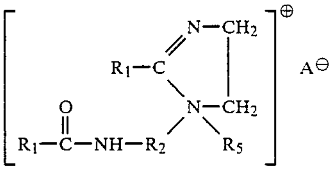

wherein $R_1$ is an acyclic aliphatic $C_{15}$–$C_{21}$ hydrocarbon group, $R_2$ is a divalent alkylene group having 1 to 3 carbon atoms, and $R_5$ and $A^{\ominus}$ are as defined above; and (vi) substituted imidazolinium salts having the formula:

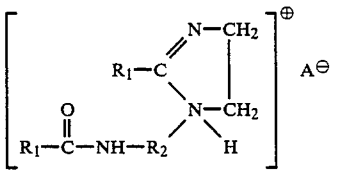

wherein $R_1$, $R_2$ and $A^\ominus$ are as defined above; and mixtures thereof.

Examples of Component I(c)(i) are the well-known dialkyldimethylammonium salts such as ditallowdimethylammonium chloride, ditallowdimethylammonium methylsulfate, di(hydrogenated tallow)dimethylammonium chloride, distearyldimethylammonium chloride, dibehenyldimethylammonium chloride. Di(hydrogenated tallow)dimethylammonium chloride and ditallowdimethylammonium chloride are preferred. Examples of commercially available dialkyldimethylammonium salts usable in the present invention are di(hydrogenated tallow)dimethylammonium chloride (trade name Adogen 442), ditallowdimethylammonium chloride (trade name Adogen 470), distearyldimethylammonium chloride (trade name Arosurf® TA-100), all available from Sherex Chemical Company. Dibehenyldimethylammonium chloride wherein $R_4$ is an acyclic aliphatic $C_{22}$ hydrocarbon group is sold under the trade name Kemamine Q-2802C by Humko Chemical Division of Witco Chemical Corporation.

Examples of Component I(c)(ii) are methylbis(tallowamidoethyl)(2-hydroxyethyl)ammonium methylsulfate and methylbis(hydrogenated tallowamidoethyl)(2-hydroxyethyl)ammonium methylsulfate wherein $R_1$ is an acyclic aliphatic $C_{15}$–$C_{17}$ hydrocarbon group, $R_2$ is an ethylene group, $R_5$ is a methyl group, $R_9$ is a hydroxyalkyl group and A is a methylsulfate anion; these materials are available from Sherex Chemical Company under the trade names Varisoft 222 and Varisoft 110, respectively.

An example of Component I(c)(iv) is dimethylstearylbenzylammonium chloride wherein $R_4$ is an acyclic aliphatic $C_{18}$ hydrocarbon group, $R_5$ is a methyl group and A is a chloride anion, and is sold under the trade names Varisoft SDC by Sherex Chemical Company and Ammonyx® 490 by Onyx Chemical Company.

Examples of Component I(c)(v) are 1-methyl-1-tallowamidoethyl-2-tallowimidazolinium methylsulfate and 1-methyl-1-(hydrogenated tallowamidoethyl)-2-(hydrogenated tallow)imidazolinium methylsulfate wherein $R_1$ is an acyclic aliphatic $C_{15}$–$C_{17}$ hydrocarbon group, $R_2$ is an ethylene group, $R_5$ is a methyl group and A is a chloride anion; they are sold under the trade names Varisoft 475 and Varisoft 445, respectively, by Sherex Chemical Company.

A preferred composition contains Component I(c) at a level of from about 10% to about 80% by weight of said Component I. A more preferred composition also contains Component I(c) which is selected from the group consisting of: (i) di(hydrogenated tallow)dimethylammonium chloride and (v) methyl-1-tallowamidoethyl-2-tallowimidazolinium methylsulfate; and mixtures thereof. A preferred combination of ranges for Component I(a) is from about 10% to about 80% and for Component I(b) from about 8% to about 40% by weight of Component I.

Where Component I(c) is present, Component I is preferably present at from about 4% to about 27% by weight of the total composition. More specifically, this composition is more preferred wherein Component I(a) is the reaction product of about 2 moles of hydrogenated tallow fatty acids with about 1 mole of N-2-hydroxyethylethylenediamine and is present at a level of from about 10% to about 70% by weight of Component I; and wherein Component I(b) is mono(hydrogenated tallow)trimethylammonium chloride present at a level of from about 8% to about 20% by weight of Component I; and wherein Component I(c) is selected from the group consisting of di(hydrogenated tallow)dimethylammonium chloride, ditallowdimethylammonium chloride and methyl-1-tallowamidoethyl-2-tallowimidazolinium methylsulfate, and mixtures thereof; said Component I(c) is present at a level of from about 20% to about 75% by weight of Component I; and wherein the weight ratio of said di(hydrogenated tallow)dimethylammonium chloride to said methyl-1-tallowamidoethyl-2-tallowimidazolinium methylsulfate is from about 2:1 to about 6:1.

The above individual components can also be used individually, especially those of I(c).

More biodegradable fabric softener compounds can be desirable. Biodegradability can be increased, e.g., by incorporating easily destroyed linkages into hydrophobic groups. Such linkages include ester linkages, amide linkages, and linkages containing unsaturation and/or hydroxy groups. Examples of such fabric softeners can be found in U.S. Pat. Nos. 3,408,361, Mannheimer, issued Oct. 29, 1968; 4,709,045, Kubo et al., issued Nov. 24, 1987; 4,233,451, Pracht et al., issued Nov. 11, 1980; 4,127,489, Pracht et al., issued Nov. 28, 1979; 3,689,424, Berg et al., issued Sept. 5, 1972; 4,128,485, Baumann et al., issued Dec. 5, 1978; 4,161,604, Elster et al., issued July 17, 1979; 4,189,593, Wechsler et al., issued Feb. 19, 1980; and 4,339,391, Hoffman et al., issued July 13, 1982, said patents being incorporated herein by reference.

Anion A

In the cationic nitrogenous salts herein, the anion $A^\ominus$ provides electrical neutrality. Most often, the anion used to provide electrical neutrality in these salts is a halide, such as fluoride, chloride, bromide, or iodide. However, other anions can be used, such as methylsulfate, ethylsulfate, hydroxide, acetate, formate, sulfate, carbonate, and the like. Chloride and methylsulfate are preferred herein as anion A.

Liquid Carrier

The liquid carrier is selected from the group consisting of water and mixtures of the water and short chain $C_1$–$C_4$ monohydric alcohols. Water used can be distilled, deionized, or tap water. Mixtures of water and up to about 15% of a short chain alcohol such as ethanol, propanol, isopropanol or butanol, and mixtures thereof, are also useful as the carrier liquid.

Optional Ingredients

Adjuvants can be added to the compositions herein for their known purposes. Such adjuvants include, but are not limited to, dyes, pigments, viscosity control agents, perfumes, emulsifiers, preservatives, antioxidants, bacteriacides, fungicides, brighteners, opacifiers, freeze-thaw control agents, shrinkage control agents, and agents to provide ease of ironing. These adjuvants, if used, are added at their usual levels, generally each of up to about 5% by weight of the composition.

Viscosity control agents can be organic or inorganic in nature. Examples of organic viscosity modifiers are fatty acids and esters, fatty alcohols, and water-miscible solvents such as short chain alcohols. Examples of inorganic viscosity control agents are water-soluble ionizable salts. A wide variety of ionizable salts can be used. Examples of suitable salts are the halides of the group IA and IIA metals of the Periodic Table of the Elements, e.g., calcium chloride, magnesium chloride, sodium chloride, potassium bromide, and lithium chloride. Calcium chloride is preferred. The ionizable salts are particularly useful during the process of mixing the ingredients to make the compositions herein, and later to obtain the desired viscosity. The amount of ionizable salts used depends on the amount of active ingredients used in the compositions and can be adjusted according to the desires of the formulator. Typical levels of salts used to control the composition viscosity are from about 1 to about 2,000 parts per million (ppm), preferably from about 3 to about 300 ppm by weight of the composition.

Example of bacteriacides used in the composition of this invention are glutaraldehyde, formaldehyde, 2-bromo-2-nitropropane-1,3-diol sold by Inolex Chemicals under the trade name Bronopol ®, and a mixture of 5-chloro-2-methyl-4-isothiazolin-3-one and 2-methyl-4-isothiazoline-3-one sold by Rohm and Haas Company under the trade name Kathon ® CG/ICP. Typical levels of bacteriacides used in the present compositions are from about 1 to about 1,000 ppm by weight of the composition.

Examples of antioxidants that can be added to the compositions of this invention are propyl gallate, available from Eastman Chemical Products, Inc., under the trade names Tenox ® PG and Tenox S-1, and butylated hydroxy toluene, available from UOP Process Division under the trade name Sustane ® BHT.

The present compositions may contain silicones to provide additional benefits such as ease of ironing and improved fabric feel. The preferred silicones are polydimethylsiloxanes of viscosity of from about 100 centistokes (cs) to about 100,000 cs, preferably from about 200 cs to about 60,000 cs. These silicones can be used as is, or can be conveniently added to the softener compositions in a preemulsified form which is obtainable directly from the suppliers. Examples of these preemulsified silicones are 60% emulsion of polydimethylsiloxane (350 cs) sold by Dow Corning Corporation under the trade name DOW CORNING ® 1157 Fluid and 50% emulsion of polydimethylsiloxane (10,000 cs) sold by General Electric Company under the trade name General Electric ® SM 2140 Silicones. The optional silicone component can be used in an amount of from about 0.1% to about 6% by weight of the composition.

Soil release agents, usually polymers, are desirable additives at levels of from about 0.1% to about 5%. Suitable soil release agents are disclosed in U.S. Pat. Nos. 4,702,857, Gosselink, issued Oct. 27, 1987; 4,711,730, Gosselink and Diehl, issued Dec. 8, 1987; 4,713,194, Gosselink, issued Dec. 15, 1987; and mixtures thereof, said patents being incorporated herein by reference. Other soil release polymers are disclosed in U.S. Pat. No. 4,749,596, Evans, Huntington, Stewart, Wolf, and Zimmerer, issued June 7, 1988, said patent being incorporated herein by reference.

Other minor components include short chain alcohols such as ethanol and isopropanol which are present in the commercially available quaternary ammonium compounds used in the preparation of the present compositions. The short chain alcohols are normally present at from about 1% to about 10% by weight of the composition.

A preferred composition contains from about 0.2% to about 2% of perfume, from 0% to about 3% of polydimethylsiloxane, from about 3 ppm to about 10 ppm of calcium chloride, from about 1 ppm to about 1,000 ppm of bacteriacide, from about 10 ppm to about 35 ppm of dye, and from 0% to about 10% of short chain alcohols, by weight of the total composition.

The pH (10% solution) of the compositions of this invention is generally adjusted to be in the range of from about 3 to about 7, preferably from about 3.0 to about 6.5, more preferably from about 3.0 to about 4. Adjustment of pH is normally carried out by including a small quantity of free acid in the formulation. Because no strong pH buffers are present, only small amounts of acid are required. Any acidic material can be used; its selection can be made by anyone skilled in the softener arts on the basis of cost, availability, safety, etc. Among the acids that can be used are hydrochloric, sulfuric, phosphoric, citric, maleic, and succinic. For the purposes of this invention, pH is measured by a glass electrode in a 10% solution in water of the softening composition in comparison with a standard calomel reference electrode.

The liquid fabric softening compositions described herein are prepared by conventional methods. A convenient and satisfactory method is to prepare the softening active premix at about 72°-77° C., which is then added, preferably with high shear, e.g., stirring, to the hot water seat. Temperature-sensitive optional components can be added after the fabric softening composition is cooled to a lower temperature.

These liquid fabric softening compositions are used by adding to the rinse cycle of conventional home laundry operations. Generally, rinse water has a temperature of from about 5.C to about 60° C. The concentration of the fabric softener actives in the compositions herein is generally from about 10 ppm to about 200 ppm, preferably from about 25 ppm to about 100 ppm, by weight of the aqueous rinsing bath.

All percentages, ratios, and parts herein are by weight unless otherwise indicated.

COMPOSITION

| Ingredient | Wt % |
|---|---|
| Adogen ® 448E-83HM[1] | 4.54 |
| Varisoft ® 445 Imidazoline[2] | 3.40 |
| Adogen ® 441[3] | 0.57 |
| Polydimethyl Siloxane (55%) | 0.18 |
| Silicone DC 1520 (20%) | 0.015 |
| Perfume | 0.40 |
| Varonic ® T220D | — |
| Kathon ® | 0.020 |
| Tenox ® S-1 | — |
| Hydrochloric Acid (31.5%) | 0.62 |
| Calcium Chloride 25% Solution | 0.50 |
| Water and minors | Balance |

[1] A mixture of ditallowalkyl dimethylammonium chloride and monotallowalkyl trimethylammonium chloride.
[2] Di long chain (tallow) alkyl imidazolinium softner.
[3] Monotallowalkyl trimethylammonium chloride.

The base product is made by a process that is similar to processes used for commercial products and the colorants which have been dissolved in water and/or the perfume are simply added to the finished product with a mixer that provides good mixing. The total electrolyte in all cases is less than 2,000 ppm.

EXAMPLE I

A 64 ounce bottle of the Composition is frozen at about −18° C. for about 4 hours and allowed to recover to ambient temperature. The composition is in a "gel" form. The bottle is then soaked in an about 9.5 liter bucket of hot tap water (about 54° C.) for about 30 minutes. The bottle is then shaken vigorously for about 20 seconds. The composition has a temperature during shaking of about 40° C. The composition is returned to a free-flowing liquid.

EXAMPLE II

The process of Example I is repeated with the modifications that about 0.2g of table salt is dissolved in about 20ml of tap water and added to the bottled composition and the water in the bucket had a temperature of about 46° C., resulting in the temperature of the composition being about 35° C. Again, the product is returned to a free-flowing liquid.

EXAMPLE III

Example II is repeated except that the product is frozen for 60 hours, 0.5 grams of table salt are used, and the water has a temperature of about 49° C. The composition is free-flowing.

COMPARATIVE EXAMPLE IV

Example III is repeated except that the composition is allowed to recover to ambient temperature (about 25° C.) and sit at that temperature for about one hour. The composition does not fully recover and has lumps of "gel" present.

EXAMPLE V

Example I is repeated with the Composition having different aesthetics that is frozen for 6 hours and the water in the bucket has a temperature of about 46° C. to give a composition temperature of about 35° C. The composition is a free-flowing liquid.

EXAMPLE VI

Example II is repeated with the Composition having different aesthetics. The product is free-flowing.

EXAMPLE VII

Example V is repeated with the heating being accomplished using a microwave oven and the heating being stopped every minute and the bottle shaken. At the end of about 7 minutes, the product is liquid and highly aerated. The composition temperature is about 46° C.

EXAMPLE VIII

A commercial product having a softener active believed to be about 6.5% hydrogenated ditallowalkyldimethylammonium chloride in a plastic bottle (Snuggle Cuddle Up Fresh®) is frozen for about 8 hours at about −18° C. The product gels. Upon rewarming to room temperature, the gel remains. 0.2 g of table salt is added in 20 ml of tap water, the temperature is raised to about 38° C. by immersing in a bucket of hot water at 48° C. The bottle is shaken vigorously and a stable dispersion is formed.

EXAMPLE IX

Example VIII is repeated with Snuggle Morning Fresh® and the same result is obtained.

What is claimed is:

1. A process for treating gelled aqueous liquid fabric softener composition, that was originally in the form of a stable dispersion of relatively water insoluble softening active in aqueous medium, to recover said composition by reforming a stable dispersion, comprising the steps of heating said composition to a temperature at least about its Krafft temperature and applying shear to reform a stable dispersion.

2. The process of claim 1 wherein said composition is heated to above its Krafft temperature.

3. The process of claim 2 wherein said temperature is at least about 35° C.

4. The process of claim 3 wherein said temperature is at least about 40° C.

5. The process of claim 2 wherein electrolyte is added to aid in reforming said stable dispersion.

6. The process of claim 1 wherein electrolyte is added to aid in reforming said stable dispersion.

7. The process of claim 6 wherein the level of said added electrolyte is less than about 3,500 ppm.

8. The process of claim 7 wherein the level of said added electrolyte is less than about 2,500 ppm.

9. The process of claim 7 wherein said electrolyte is sodium chloride.

10. The process of claim 6 wherein said electrolyte is sodium chloride.

11. The process of claim 1 wherein said composition is packaged in a consumer usable form.

12. The process of claim 11 wherein said composition is heated by placing the package in which said composition is packaged into hot water that has a temperature at least about the Krafft temperature of said composition.

13. The process of claim 12 wherein said shear is applied by vigorously shaking said package.

14. The process of claim 13 wherein said temperature is at least about 35° C.

15. The process of claim 13 wherein said temperature is at least about 40° C.

16. The process of claim 14 wherein electrolyte is added at a level of less than about 2,500 ppm to aid in reforming said stable dispersion.

17. The process of claim 16 wherein said electrolyte is sodium chloride.

18. The process of claim 1 wherein said process is carried out on said composition in bulk in a large container.

19. The process of claim 18 wherein said temperature is at least about 35° C.

20. The process of claim 18 wherein said temperature is at least about 40° C.

21. The process of claim 18 wherein electrolyte is added at a level of less than about 2,500 ppm to aid in reforming said stable dispersion.

22. The process of claim 21 wherein said electrolyte is sodium chloride.

* * * * *